United States Patent
Kobayashi et al.

(10) Patent No.: US 6,939,657 B2
(45) Date of Patent: Sep. 6, 2005

(54) METHOD OF MANUFACTURING POLYMER RESIN PARTICLES FOR USE IN TONERS

(75) Inventors: Naomichi Kobayashi, Nagoya (JP); Masato Tanaka, Niigata (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 114 days.

(21) Appl. No.: 10/603,599

(22) Filed: Jun. 26, 2003

(65) Prior Publication Data

US 2004/0048184 A1 Mar. 11, 2004

(30) Foreign Application Priority Data

Jun. 27, 2002 (JP) ........................................ 2002-187300
Jun. 19, 2003 (JP) ........................................ 2003-174269

(51) Int. Cl.[7] ................................................. G03G 9/08
(52) U.S. Cl. .............................. 430/137.17; 430/109.3; 430/137.15
(58) Field of Search ........................ 430/137.15, 137.17, 430/137.14, 110.1, 108.8, 137.11, 109.3

(56) References Cited

U.S. PATENT DOCUMENTS

| | | | |
|---|---|---|---|
| 4,535,049 A | * 8/1985 | Honda et al. ........... | 430/137.17 |
| 4,592,990 A | 6/1986 | Takagi et al. | |
| 5,935,751 A | * 8/1999 | Matsuoka et al. ....... | 430/108.8 |
| 6,054,239 A | 4/2000 | Ohira et al. | |

FOREIGN PATENT DOCUMENTS

| | | |
|---|---|---|
| JP | A 64-59240 | 3/1989 |
| JP | B2 5-45029 | 7/1993 |
| JP | A 5-181315 | 7/1993 |
| JP | A 6-58543 | 8/1994 |
| JP | B2 2504745 | 4/1996 |
| JP | A 11-65164 | 3/1999 |
| JP | A 2000-98654 | 4/2000 |
| JP | A 2000-347456 | 12/2000 |
| JP | A 2001-27821 | 1/2001 |

* cited by examiner

*Primary Examiner*—Janis L. Dote
(74) *Attorney, Agent, or Firm*—Oliff & Berridge, PLC

(57) ABSTRACT

A method of manufacturing polymer particles for use in a toner capable of incorporating fine wax particle in a polymer resin particle also in a case of adopting a dispersion polymerization method used generally so far, thereby enabling to prevent offset in a heat fixing device provided to copying machines or printers thereby improving the fixing property of the toner and capable of forming images at fine fineness when the polymer resin particles are used as the toner. The fine wax particle is dispersed by using the polymeric dispersant into an organic solvent and one or more of monomers for forming the polymer is dissolved and the polymerizing reaction of the monomer is proceeded while depositing the fine polymer particles on the surface of the fine wax particle upon deposition of the polymer into the organic solvent in the initial stage of the polymerizing reaction of the monomer, thereby incorporating the fine wax particles into the formed polymer particle.

22 Claims, 3 Drawing Sheets

METHOD OF MANUFACTURING POLYMER RESIN PARTICLES FOR USE IN TONERS

BACKGROUND OF THE INVENTION

1. Field of the Invention

The present invention concerns polymer particles for use in toners usable for toners that are used in electrophotographic copying machines or printers and, more in particular, it relates to a method of manufacturing polymer particles for use in toners capable of preventing offset in heat fixing devices provided to copying machines or printers when used as toners, thereby capable of improving the fixing property and durability of the toners and capable of forming images at high fineness.

2. Description of Related Art

Toners used for copying machines or printers have been manufactured so far by a so-called pulverization method of melt kneading a colorant such as a carbon black or a pigment, additives, for example, a releasing agent such as wax and a binder resin by an extruder, followed by pulverization and classification. However, higher image quality has been demanded in recent years for copying machines and printers and, accordingly, it is demanded that the toner grain size is as small as 3 to 9 μm and the grain size distribution is also narrow. Attainment of such demands by the existent manufacturing method involves problems such as lowering of yield as the grain size is smaller.

Further, the toner particles obtained by the pulverization method involve a problem that their grain size distribution is wide although they are classified, and accordingly, the amount of static charges varies greatly due to the scattering of the grain size when individual toner particles are charged upon image formation. Further it also involves a problem of poor fluidity since the shape of the toner particles is indefinite.

On the other hand, a toner manufacturing method by a polymerization method has been known as a manufacturing method instead of the pulverization method in recent years. By the use of the method, a toner of a small grain size and a narrow grain size distribution can be obtained different from the pulverization method. The polymerization method includes emulsion polymerization, suspension polymerization, and dispersion polymerization, and the dispersion plymerization tends to be selected since spherical toners with narrow grain size distribution can be obtained easily.

As a method of manufacturing a toner using the dispersion polymerization method, Japanese Patent Laid-Open No. Hei 5(1993)-181315, for example, discloses a method of manufacturing a toner for development of static charge images formed by dying polymer resin particles obtained by adding and polymerizing vinyl monomers in a polymeric dispersant, adsorbing an emulsion wax at the surface of the obtained particles and further continuing polymerization. According to the toner manufacture method described above, it is possible to manufacture a toner having excellent offset resistance in heat roll fixing and excellent in fluidity.

Further, Japanese Patent No. 2504745 describes a method of manufacturing an electrophotographic toner of dissolving or dispersing a radical polymerization monomer and a colorant in which an anti-offset agent such as various kinds of waxes is previously dissolved or dispersed into a reaction medium and polymerizing the radical polymerizable monomer under the presence of a radical initiator thereby obtaining a substantially spherical particle comprising a composition of the resin and the colorant. According to the manufacturing method described above, since the anti-offset agent is joined in a state dissolved or dispersed in a finely particulate state with the resultant polymer particle in the polymerizing reaction system, and the anti-offset agent is present as fine particles in the colored polymer particle, it is possible to manufacture a toner excellent in electrophotographic property as the toner.

However, in the toner manufacturing method described in Japanese Patent Laid-Open No. Hei 5(1993)-181315, the grain size of the polymer resin particles, and the addition amount of the wax have to be controlled strictly for uniformly depositing the wax particles on the surface of the polymer resin particle. Unless the control is conducted strictly, dispersed state of the wax in the mixed solution is instable and, as a result, the polymer resin particles tend to cause agglomeration to each other, so that the amount of the wax, if incorporated, in the polymer resin particle, is extremely small and not uniform.

Further, in the toner manufacturing method described in the U.S. Pat. No. 2,504,745, the amount of wax as the anti-offset agent that can be previously dissolved in the monomer is extremely small and since it is necessary to dissolve the wax into the monomer, the wax that can be used is restricted. Accordingly, the amount of the wax, if incorporated in the polymer resin particle constituting the toner, is extremely small.

As described above, in the toner manufactured by the dispersion polymerization method described in Japanese Patent Laid-Open No. Hei 5(1993)-181315 or Japanese Patent No. 2504745, only an extremely small amount of wax can be incorporated in the polymer resin particles. AS a result, when such polymer resin particles are used as the toner, they result in a problem that the mold releasing effect can not be provided sufficiently.

Therefore, in the printer using the toner described above, so-called heat-offset occurs during heat roller fixing and it is necessary to coat a releasing agent such as a silicone oil to a roller in order to prevent the heat offset. The coating of the releasing agent to the roller needs an additional coating device, which brings about a problem of increasing the cost of the printer main body.

SUMMARY OF THE INVENTION

The present invention has been achieved in order to solve the problems described above and it intends to provide a method of manufacturing a polymer particle for use in a toner capable of incorporating a sufficient amount of fine wax particles into the polymer resin particle, and capable of preventing offset in a heat fixing device provided to copying machines or printers in a case of using such polymer resin particles as the toner thereby capable of forming images at high fineness with improved fixing property and durability of the toner.

For attaining the foregoing purpose the present invention provides, according to one aspect, a method of manufacturing a polymer resin particle for use in a toner of dispersing fine wax particles less soluble to an organic solvent by using a polymeric dispersant in the organic solvent, dissolving one or more kinds of monomers for forming a polymer less soluble to the organic solvent, and proceeding the polymerizing reaction of the monomers while depositing fine polymer particles on the surface of the fine wax particles upon depositing the polymer into the organic solvent in the initial stage of the polymerizing reaction of the monomers, thereby forming polymer resin particles for use in a toner incorporating fine wax particles, wherein the wax ingredient forming the fine wax particles is selected such that the surface potential of the fine wax particles dispersed in the organic solvent shows a polarity opposite to the surface potential of the fine polymer particle.

In accordance with the method of manufacturing the polymer resin particle in one aspect of the invention, since the wax ingredient forming the fine wax particle is selected such that the surface potential of the fine wax particle shows the polarity opposite to the surface potential of the fine polymer particles upon dispersion of the fine wax particles in the organic solvent by using the polymeric dispersant, one or more kinds of monomers forming the polymer is dissolved and the polymerizing reaction of the monomer is proceeded while depositing the fine polymer particles on the surface of the fine wax particles upon deposition of the polymer in the organic solvent in the initial stage of the polymerizing reaction process of the monomer, the fine polymer particles are attracted to the surface of the fine wax particles in the initial stage of the monomer polymerizing reaction and, accordingly, the fine polymer particles can be deposited in a short time and simply on the surface of the fine wax particles. Further, fine wax particles can be incorporated sufficiently in the resultant polymer particles.

In a case of using the polymer particles formed as described above for the toner, since a sufficient amount of fine wax particles is incorporated in the polymer particle, it is possible to prevent offset in the heat fixing device provided to the copying machine or the like without conducting external addition of the wax or provision of oil coating device to the copying machine, thereby capable of improving the fixing property and the durability and also capable of forming highly fine images.

DETAILED DESCRIPTION OF THE PREFERRED EMBODIMENTS

Figure 1:
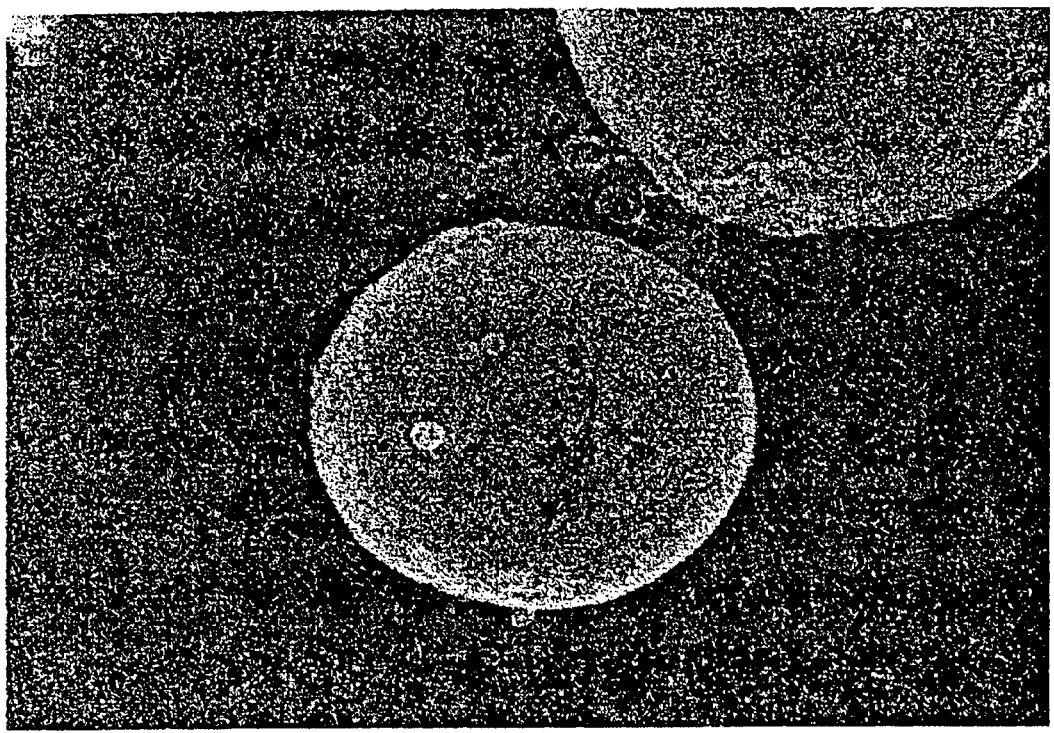
FIG. 1 is an electron microscopic photograph of a polymer particle resin.

A method of manufacturing a polymer resin particles according to the present invention is to be described.

As the manufacturing method for the polymer resin particles according to the invention, a dispersion polymerization method is adopted. The dispersion polymerization step is a step of adding a polymeric dispersant soluble to an organic solvent into the organic solvent, and adding one or more kinds of monomers which are soluble to the organic solvent with the polymer resultant therefrom being swollen but not scarcely dissolved in the organic solvent thereby forming particles. The monomer utilized for the growing reaction is soluble to the organic solvent but the polymer is insoluble to the organic solvent.

The polymeric dispersant added into the organic solvent is properly selected depending on the organic solvent used and the aimed polymer resin particle and, particularly, those dispersants having high affinity and adsorbability to the surface of the polymer resin particle and having high affinity and solubility to the organic solvent are selected with a view point of mainly preventing sterical agglomeration of polymer resin particles.

Upon starting the reaction, the polymeric dispersant is dissolved, the monomer is added, oxygen in the system is replaced with an inert gas, and reaction is started while previously adding a polymerization initiator and elevating the temperature in the system upon start of polymerization. The temperature in the system is increased by elevating up to a temperature corresponding to the decomposing rate of the initiator used. Then, the monomer starts polymerization by the polymerization initiator and, when they are grown to a critical molecular amount to the organic solvent in which they are dissolved the monomers are deposited to form particles since it is considered that the particle size immediately after the deposition is small and it is insufficient to cover all the surface areas of the already dispersed wax particles and deposited polymer particles with the addition amount of the previously added polymeric dispersant, both of the dispersed particles are in an extremely instable state as they are. However, since the zeta-potential is different between the wax particle and the deposited polymer resin particle, the polymer particles are electrostatically attracted to the wax, deposited and integrated with the wax surface to form stable nuclei. The process from deposition to stabilization occurs in an extremely short period of time.

For the once formed stable nuclear particle, polymerization proceeds in the particle by further continuing the reaction and the particle grows while incorporating the wax. Then, the polymer resin particle of the invention can be obtained by terminating the reaction when a desired particle size is obtained.

The organic solvent used in the invention can include, specifically, alcohols such as methanol, ethanol, n-butanol, s-butanol, t-butanol, n-amyl alcohol, s-amyl alcohol, t-amyl alcohol, isoamyl alcohol, isobutyl alcohol, isopropyl alcohol, 2-ethylbutanol, 2-ethylhexanol, 2-octanol, n-octanol, n-decanol, cyclehaxanol, n-hexanol, 2-heptanol, 3-heptanol, 3-pentanol, methylcyclohexanol, 2-methyl-2-butanol, 3-methyl-2-butanol, 3-methyl-1-butin-3-ol, 4-methyl-2-pentanol, and 3-methyl-1-pentin-3-ol, aliphatic hydrocarbons such as hexane, heptane, octane, isooctane, and nonane, substituted hydrocarbons such as nitromethane, cycloaliphatic hydrocarbons such as cyclohexane, cyclononane, cyclohexadiene, cycloheptane and decahydronaphthalene, aromatic hydrocarbons such as benzene, toluene, xylene, chlorobenzene, dichlorobenzene, ethylbenzene, anisole and diisopropylnaphthalene, halogenated hydrocarbons such as dichloromethane, chloroform, and chloroethane, ether such as ethyl benzyl ether, dibutyl ether, dipropyl ether, dibenzyl ether, dimethyl ether, vinyl methyl ether, vinyl ethyl ether, diethylene ether, and tetrahydrofuran, ketones such as methyl ethyl ketone, methyl butyl ketone, acetoaldehyde, acetone, acetophenone, diisobutyl ketone, diisopropyl ketone and cyclohexanone, esters such as ethyl formate, ethyl acetate, methyl acetate, ethyl stearate and methyl salycilate, and water. The solvents may be used alone but, in most cases, used in combination for controlling the SP value (Solubility Parameter) of the reaction system.

Then, the dispersant added into the organic solvent functions as a dispersant for fine dispersion of the wax and a stabilizer for the polymer resin particle and can include, for example, specifically, polyvinyl pyrrolidone, polyvinyl alcohol, 1-hexadecanol, hydroxypropyl cellulose, hydroxypropylnaethy(ethyl) cellulose, poly(12-hydroxystearic acid), poly(styrene-b-dimethylsiloxane) and polyisobutylene. The polymeric dispersant added into the organic solvent is properly selected depending on the organic solvent used and the aimed polymer resin particle. Particularly, those dispersants having high affinity and adsorbability to the surface of the polymer resin particle and having high affinity and solubility to the organic solvent are selected with a view point of mainly preventing sterical agglomeration of polymer resin particles. Further, for increasing the repulsion between the polymer resin particles to each other with a sterical view point, those having molecular chains to some extent, preferably, those having a molecular weight of 10,000 or more are selected. With the view points described above, for making the grain size uniform and the grain size distribution narrow for the polymer resin particles to be produced, polyvinyl pyrrolidone is preferred as the polymeric dispersant. Further, plural kinds of polymeric dispersants may be used in combination. Further, the addition amount of the polymeric dispersant used is 5 parts by weigiit or more based on the addition amount of the monomer while this varies depending on the grain size of the polymer resin particle produced as the aimed product. When the amount is smaller, no sufficient sterical repulsion can be obtained between the polymer particles upon deposition of the polymer particle in the course of the initial polymerization and they agglomerate with each other.

The polymer constituting the polymer resin particle can include homopolymer and copolymers of styrene and derivatives thereof such as polystyrene, poly-p-chlorostyrene, polyvinyltoluene, styrene-p-chlorostyrene copolymer and styrene vinyltoluene copolymer, copolymers of styrene and acrylates such as styrene methylacrylate copolymer, styrene ethylacrylate copolymer, and styrene-n-butyl acrylate copolymer; copolymers of styrene and methacrylate such as styrene-methylmethacrylate copolymer, styrene-ethylmethacrylate copolymer, and styrene-n-butylmethacrylate copolymer; polynary copolymer of styrene, acrylate and methacrylate; as well as styrenic copolymers such as copolymers of styrene and other vinylic monomer, such as styrene-acrylonitrile copolymer, styrene-vinylmethyl ether copolymer, styrene-butadiene copolymer, styrene-vinyl methyl ketone copolyrner, styrene-acrylonitrile-indene copolymer and styrene-maleate copolymer; polymethyl methacrylate, polybutyl methacrylate, polyvinyl acetate, polyester, polyamide, epoxy resin, polyvinyl butyral, polyacrylic acid, phenolic resin, aliphatic or cycloaliphatic hydrocarbon resin, petroleum resin and chlorinated paraffin, which may be used alone or may be used in an appropriate combination thereof. The monomer in the invention comprises a so-called polymerizable monomer for forming the polymer described above and at least one kind of monomer is used in accordance with the kind of the polymer.

In the case of use as the toner, the polymer preferably has high transparency in view of the application use to OHP and it is preferred that the insulation property is high in order to obtain good developed images. Further, it is necessary to have a high dynamic strength at a normal temperature and it is desirably softened by low energy and fixed to an object to be drawn. In view of the foregoing, in a case of using the polymer resin particle in the preferred embodiment as the photographic toner, styrene series copolymers or polyester series polymers are used suitably for instance.

For example, the monomer as the starting material for the styrene series copolymer can include aromatic vinyls such as styrene, vinyltoluene and α-methylstyrene, methacrylic esters such as methyl methacrylate, ethyl methacrylate and 2-ethylhexyl methacrylate, acrylic esters such as ethyl acrylate, ethyl acrylate, butyl acrylate, and ethylhexyl acrylate, vinylic esters such as vinyl formate, vinyl acetate, vinyl propionate, vinyl ethers such as vinylmethyl ether and vinylethyl ether, methacrylic acid, acrylic acid, maleic acid anhydrides, and metal salts thereof, monomers having functional groups such as diethylaminoethyl methacrylate and diethylaminoethyl acrylate, and fluoro-containing monmers such as trifluoroethyl methacrylate and tetrafluoropropyl methacrylate. Among them, copolymers comprising styrene and one or more kinds of monomers of acrylic ester or methacrylic esters are preferred.

The polymerization initiator for forming the polymer from the monomer by the polymerizing reaction can include, specifically, azo hydrochloride series such as
2,2'-azobis(2-methyl-N-phenylpropionamidine) dihydrochloride,
2,2'-azobis[N-(4-chlorophenyl)-2-methylpropionamidine] dihydrochloride,
2,2'-azobis [N-(4-hydroxyphenyl)-2-methylpropionamidine]dihydrochloride,
2,2'-azobis [N-(4-aninophenyl)-2-methylpropionamidine] tetrahydrochloride,
2,2'-azobis[2-methyl-N-(phenylmethyl)propionamidine] dihydrochloride,
2,2'-azobis[2-methyl-N-2-propenylpropionamidine] dihydrochloride
2,2'-azobis(2-methylpropionamidine)dihydrochloride,
2,2'-azobis[N-(2-hydroxyethyl)-2-methylpropionamidine] dihydrochloride,
2,2'-azobis[(2-5-methyl-2-imidazolin-2-yl)propane] dihydrochloride,
2,2'-azobis[2-(2-imidazolin-2-yl)propane]dihydrochloride,
2,2'-azobis[2-(4,5,6,7-tetrahydro-1H-1,3-diazepin-2-yl) propane]dihydrochloride,
2,2'-azobis[2-(3,4,5,6-tetrahydropyridin-2-yl)propane] dihydrochloride,
2,2'-azobis[2-(5-hydroxy-3,4,5,6-tetrahydropyridin-2-yl) propan]dihydrochloride,
2,2'-azobis{2-[1-(2-hydroxyethyl)-2-imidazolin-2-yl] propane}dihydrochloride.
Further, other azo initiators can include;
2,2'-azobisisobutylonitrile,
2,2'-azobismethylbutylonitronitrile,
2,2'-azobis-2-cyclopropylpropionitrile,
2,2'-azobis-4-methoxy-2,4-dimethylvaleronitrile,
1,1'-azobiscyclohexane-1-carbonitrile,
2,2'-azobis(2,4-dimethyl)valeronitrile,
2-phenylazo-4-methoxy-2,4-dimethylvaleronitrile, and
2,2'-azobis-N,N-dimethylisobutylamidine.
Further, organic peroxide initiator can include, for example, benzoyl peroxide, methyl ethyl ketone peroxide, cumene hydroxy peroxide, t-buthylhydro peroxide, cyclohexanone peroxide, t-butyl peroxide, t-butyl peroxybenzoate, t-butylperoxy-2-ethyl hexanoate, t-butylperoxy pervaleate, t-butylperoxy neodecanoate, 3,5,5-trimethylhexanoyl peroxide, diisopropylbenzene hydroperoxide, lauroyl peroxide, and dicumyl peroxide. The initiator may be used alone or plural kinds of them may be used in admixture. Among the initiators, 2,2'-azobisisobutylonitrile and benzoyl peroxide are particularly preferred. The addition amount of the polymerization initiator is 0.1 to 10 parts by weight based on 100 parts by weight of the monomer.

For forming tke polymer of the invention, the polymer may be crosslinked by using a crosslinker to form a crosslinked polymer. As the crosslinker, usual crosslinkers may be properly used. Specifically, it can include, for example, divinyl benzene, divinyl naphthalene, divinyl ether, divinyl sulfone, ethylene glycol di(meth)acrylate, butanediol di(meth)acrylate, trimethylolpropane tri(meth) acrylate and pentaerythritol tri(meth)acrylate.

The fine wax particles preferably have an average particle size of 1 μm or less. In embodiments, a plurality of fine wax particles are incorporated in the polymer resin particle for use in the toner.

The wax to be finely dispersed in the first embodiment can include, specifically, those having functional groups or those attached with functional groups are used, among petroleum wax, such as paraffin wax, and microcrystalline wax, plant type wax such as carnauba wax, candelilla wax, rice wax and Japan wax, animal type wax such as bee wax and whale wax, mineral type wax such as montan wax, ozocerite wax, ceresin wax, synthesis wax such as polyethylene wax Fisher-Tropsch wax, amide wax, and hardened castor oil. As the functional group, at least one of the groups selected from the group consisting of hydroxyl group, carboxyl group, carbonyl group, ether group, phenyl group, phosphate group and sulfonate group is selected.

The wax incorporated in the polymer resin particle is selected from those having the zeta-potential at the surface of the fine particle measured in the dispersant medium used upon production opposite to the zeta-potential of the polymer resin particle incorporating the wax. This can facilitate agglomeration between fine wax particles and polymer resin particles in the initial stage of growing by attraction to each other upon deposition of the polymer resin particles in the initial stage of production process. The thus selected wax is added together with the polymeric dispersant into the organic solvent and previously dispersed finely before starting polymerization of the monomer.

In the case of using the polymer resin particles produced as described above for the toner, it is necessary for coloration. The coloration method includes a method of previously coloring the wax or a method of applying coloration after preparing the polymer resin particles.

The method of previously coloring the wax can include dispersion of a pigment and dissolution of a dye. As the pigment, various inorganic pigments such as magnetite and organic pigments can be used. For example, the pigment can include azo pigments such as azo lake, insoluble azo pigment, condensed azo pigment and chelate azo pigment, polynuclear pigments such as phthalocyanine pigment, perylene pigment and perinone pigment, anthraquinone pigment, quinacridone pigment, dioxazine pigment, thioindigo pigment, isoindolinone pigment, and quinophthalone pigment, dye lakes such as basic dye lake and acidic dye lake, organic pigments such as nitro pigment, nitroso pigment and aniline black daylight fluorescence pigment, and inorganic dyes such as titanium oxide. Other pigments dispersible in the wax may also be used. Further, the dye can include, for example, direct dye, acidic dye, dispersion dye, cation dye, reactive dye, sulfide dye, oil soluble dye and metal complex dye other pigment soluble to the wax may also be used.

When the pigment or the dye is dispersed into the wax, it is desirable to finely disperse the pigment or the dye by mixing and stirring and finely disperse the pigment or the dye to the heated wax thereby incorporating the pigment or the dye in the wax to form a pigment-containing wax.

In a case of coloration after the preparation of the polymer resin particle, the coloration method can include a method, for example, of dispersing a dye and a polymer resin particle in an aqueous solvent and, elevating the temperature to higher than the softening point and lower than the temperature of the softening point of the polymer resin particle +40° C. and then stirring them for coloration.

The dye used for coloration is direct dye, acidic dye, dispersion dye, cation dye, reactive dye, sulfide dye, oil soluble dye or metal complex dye. Among the colorants, the dispersion dye and cation dye are particularly preferred. After coloring the polymer resin particle with the dye, reduction cleaning is conducted for removing surplus dye deposited on the surface of the polymer resin particle. The solvent used for the reduction cleaning is an aqueous solution in which sodium hydroxide or hydroxy sulfite is dissolved.

Then, a fine organic powder and a charge controller are added to the colored polymer resin particles described above to prepare toner matrix particles. As the method of adding the fine organic powder and the charge controller, as disclosed in Japanese Patent Laid-Open No. Hei 11(1999)-65164, the colored polymer resin particles, the fine organic powder and the charge controller are mixed by means of mechanical impact to spike the fine organic powder and the charge controller to the surface of the colored polymer resin particles.

The fine organic powder can include, for example, fine acrylic resin powder, fine fluoro resin powder, fine silicon type resin powder and fine melamine type resin powder.

The charge controller can include, for example, metal-containing azo compound, salicylate series metal complex, nigrosine, triphenylmethane and quaternary ammonium salt.

Then, after the spiking treatment of the fine organic powder and the charge controller to the surface of the colored polymer resin particles as described above, hydrophobic silica or conductive titanium oxide is externally added in order to improve the toner fluidity or improve the uniform chargeability of the toner.

The hydrophobic silica can include, for example, those silica the surface of which is treated with dimethyldichloro silane, dimethylpolysiloxane, hexamethyldisilazane, aminosilane and amine. For example, they can include H2000, H3004 and HVK2150 manufactured by Wakker, and R974, RY200, RX200, RX300, RA200H, and REA200 manufactured by Nippon Aerosil.

As the conductive titanium oxide, titanium oxide the surface of which is treated, for example, with a tin oxide series semiconductor or indium oxide series semiconductor is preferred. It is particularly preferred that the conductive titanium oxide has a resistance value of about 1 to 50 $\Omega \cdot cm$, and a BET specific surface area of about 5 to 70 $m^2/g$. For example, it can include EC-100, EC-210, EC-300 and EC-500 manufactured by Titan Kogyo.

EXAMPLE

Concrete examples for the method of manufacturing the polymer resin particles are to be described more specifically.

Example 1

① Fine Dispersion Treatment for Fine Wax Particles

A mixture comprising the composition shown below is charged in a reaction vessel equipped with a stirrer, a condenser, a thermometer and a gas introduction tube.

| | |
|---|---|
| Ethanol 90 wt % aqueous solution | 300.0 parts by weight |
| Polyvinyl pyrrolidone | 5.0 parts by weight |
| Wax (CELAMER 67: manufactured by Toyo Petrolite Co.) | 15.0 parts by weight |

After stirring and mixing the mixture at 60° C. by 250 rpm for 5 hours while supplying a nitrogen gas, the number of rotation was increased to 10,000 rpm and, further, it was stirred for 15 min or more to obtain a fine liquid dispersion of wax. The average grain size of wax was 0.36 μm. The zeta-potential of the wax was measured by using laser zeta potentiometer ELS-8000 manufactured by Otsuka Electronics Co., Ltd. Zeta-potential was (+).

② Polymer Particle Resin Forming Treatment

Then, into the fine liquid dispersion solution of wax obtained as described above,

| | |
|---|---|
| Styrene | 59.9 parts by weight |
| n-butyl acrylate | 17.9 parts by weight |
| α,α'-azobisisobutylonitrile | 4.7 parts by weight | were added as the monomer and stirring was initiated at 60° C. by 250 rpm. The monomer was grown in about one hour from the start of the stirring and a polymer started to deposit in the first embodiment. In this case, the fine polymer particles deposited on the surface of the wax by the static electricity caused between them and the wax previously dispersed in the solution.

When stirring was conducted for further 4 hours, to continue growing and deposition of the monomer and the grain size was measured by using a laser diffraction type grain size distribution measuring apparatus SALD-3000 manufactured by Shimadzu Corporation, the volume average particle size reached 15.6 μm to obtain an aimed particle size. Then, stirring was stopped and cooling was conducted by an iced water bath to 20° C. The obtained polymer resin particles were filtered and recovered, washed water methanol and left for 48 hours at a room temperature to dry the polymer resin particles.

③ Polymer Resin Particle Recovery Treatment

The liquid dispersion of the polymer resin particles obtained as described above was recovered by filtration and the particles were washed with methanol.

The recovered particles were re-dispersed in 400 ml of an aqueous 30 ppm solution of sodium dodecyl benzene sulfonate, temperature was elevated and the wax not incorporated into the polymer resin particle was separated by melting. Then, NaCl was added to completely separate the wax and only the polymer resin particles were recovered by filtration and stood still at a room temperature for 48 hours to dry and obtain polymer resin particles. When the zeta-potential of the particles was measured, it showed (−) and it could be confirmed that the surface was covered with the polymer resin. When the polymer resin particles at this step were confirmed by a scanning type electron microscope (manufactured by Shlimadzu Corporation) it had a substantially spherical shape as shown in FIG. 1.

④ Confirmation of Wax Incorporation: Differential Thermal Analysis

The polymer resin particle obtained as described above was measured by a differential thermal analyzer. A specimen to be measured was placed by 2.5 mg in an aluminum pan and measurement was conducted within a measuring temperature range of 30° C. to 150° C. at a temperature elevation rate of 5° C./min while also using wax-free resin particles as a reference. Further, only the wax was placed by 2.6 mg in the aluminum pan and measured under the same conditions as described above.

Figure 2:
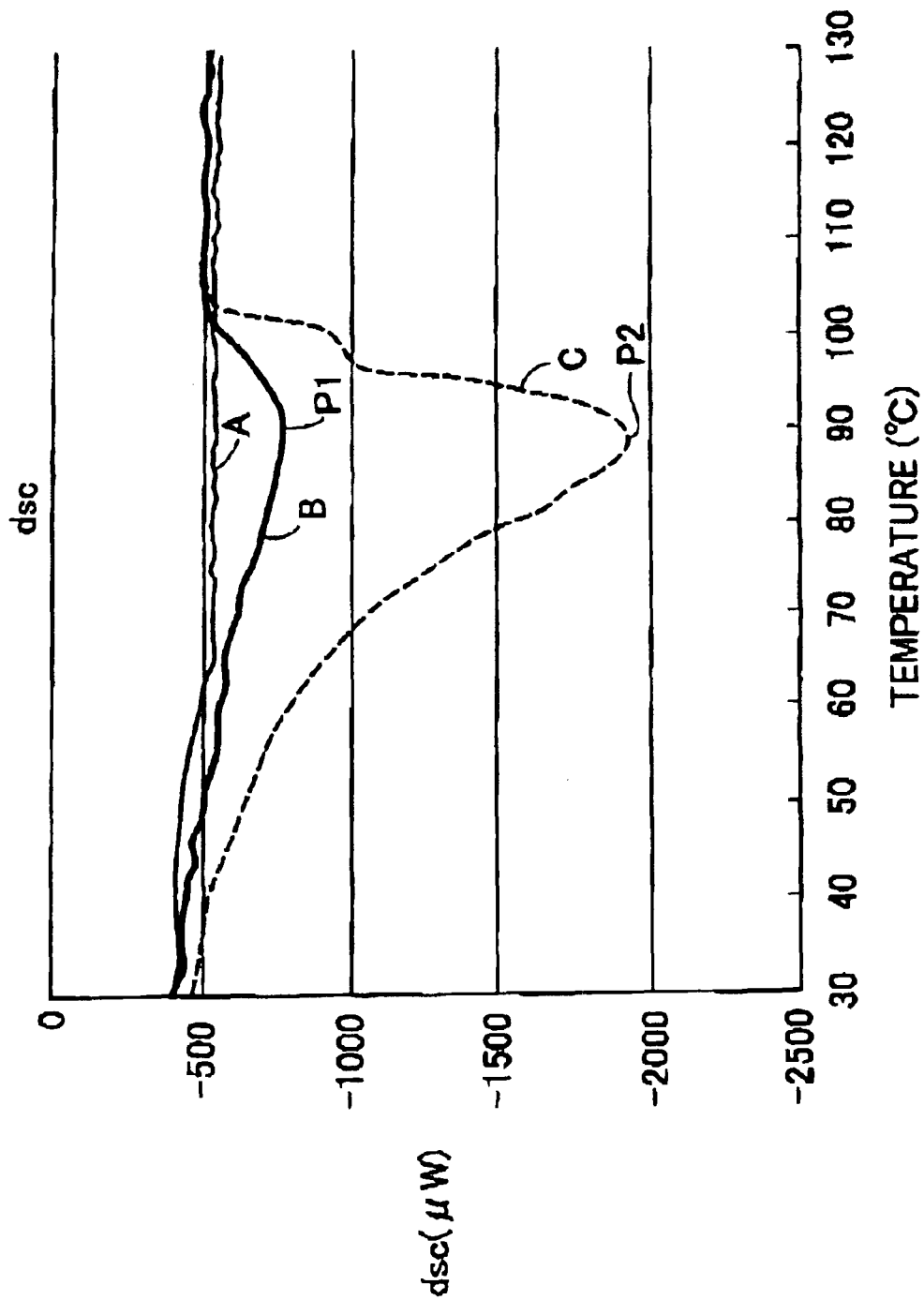
FIG. 2 is an explanatory graph showing the result of differential thermal measurement conducted for the polymer resin particles obtained in Example 1, in which curve A is a reference curve measured for a resin particle not containing wax, curve B is a curve showing the result of measurement obtained for measured sample containing a polymer resin particle and curve C shows the result of measurement only for wax.

The result of the measurement described above is shown in FIG. 2. In FIG. 2, curve A is a reference curve for measurement of wax-free resin particles in which neither endothermic reaction nor exothermic reaction was taken place. Further, curve B shows the result of measurement obtained for the measured specimen in which a small peak P1 for endothermic reaction was obtained near 90° C. The peak P1 is an endothermic peak due to melting of the fine wax particles incorporated in the polymer resin in the measured sample and it can be seen therefrom that the fine wax particles were incorporated in the polymer resin particles. Curve C shows the result for measurement only for the wax in which a large peak P2 for endothermic reaction was obtained near 90° C., as well as in the curve B. It can be seen also from the endothermic peak P2 in the curve C that the endothermic P1 obtained for the curve B is a peak generated due to the melting of the fine wax particles incorporated in the polymer resin article.

⑤ Confirmation of the Wax Content

The polymer resin particles obtained as described above were dissolved in a styrene monomer to take out only the incorporated wax. Weight of the taken out wax was divided by the weight of the polymer resin particles before dissolution to determine the content. It was about 15%.

⑥ Confirmation of Incorporated Form of Wax

The polymer resin particles obtained as described above were embedded in an epoxy resin and a slice of about 100 nm was prepared by using an ultra-microtome. Then, it was reinforced with carbon and observed by using an electron microscope (model H-8100, manufactured by Hitachi) at an acceleration voltage of 100 kV. As a result, it was confirmed that several fine wax particles are incorporated in the polymer resin particle.

Example 2

① Fine Dispersion Treatment for Fine Wax Particles

A mixture comprising the composition shown below was charged into a reaction vessel equipped with a stirrer, a condenser, a thermometer and a gas introduction tube.

| | |
|---|---|
| Ethanol 90 wt % aqueous solution | 300.0 parts by weight |
| Polyvinyl pyrrolidone | 5.0 parts by weight |
| Wax (YUNILIN 700: manufactured by Toyo Petrolite Co.: zeta-potential +) | 15.0 parts by weight |

After stirring and mixing the mixture at 75° C. for 5 hours by 250 rpm while supplying a nitrogen gas, the number of rotation was increased to 10,000 rpm and, further, it was stirred for 30 min to obtain a fine liquid dispersion of the wax. The average grain size of the wax was 0.52 μm. The zeta-potential for the fine wax particles was measured by using laser zeta potentiometer ELS-8000 manufactured by Otauka Electronics Co., Ltd. The data potential was (+).

② Polymer Particle Resin Forming Treatment

Then, into the finely dispersed liquid of the obtained wax, were added:

| | |
|---|---|
| Styrene | 59.9 parts by weight |
| n-butyl acrylate | 17.9 parts by weight |
| α,α'-azobisisobutylonitrile | 4.7 parts by weight | as monomers and stirring was started at 60° C. by 250 rpm. The monomer was grown in about one hour from the start of the stirring and a polymer started to deposit in the first embodiment, in which the fine polymer particles deposited on the surface of the wax by static electricity generated between them and the wax previously dispersed in the solution.

Further, stirring was conducted for further 4 hours, to continue growing and deposition of the monomer and when the grain size was measured by using a Shimadzu laser diffraction type grain size distribution measuring apparatus SALD-3000 manufactured by Shimadzu Corporation, the volume average particle size reached 15.0 μm to obtain an aimed particle size.

③ Polymer Resin Particle Recovery Treatment

The liquid dispersion of the polymer resin particles obtained as described above was recovered by filtration and the particles were washed with methanol.

The recovered particles were re-dispersed in 400 ml of an aqueous 30 ppm solution of sodium dodecyl benzene sulfonate, temperature was elevated and the wax not incorporated in the polymer resin particle was separated by melting. Then, NaCl was added to completely separate the wax and recover only the polymer resin particles by filtration which were left to dry at a room temperature for 48 hours, to obtain polymer resin particles. When the zeta-potential of the particle was measured, it showed (−) and it can be confirmed that the surface was covered with the polymer resin. Further, when the polymer resin particle was confirmed by a scanning type electron microscope (manufactured by Shimadzu Corporation), it had a substantially spherical shape as shown in FIG. 1 in the same manner as in Example 1.

④ Confirmation of Wax Incorporation: Differential Thermal Analysis

The polymer resin particle obtained as described above was measured by a differential thermal analyzer. The specimen for measurement was placed into an aluminum pan by 2.5 mg and measurement was conducted within a range of the measuring temperature from 30° C. to 150° C. at a temperature elevation rate of 5° C./min while using wax-free resin particles as a reference. Further, only the wax was placed by 5 mg in the aluminum pan and measured under the same conditions as described above.

Figure 3:
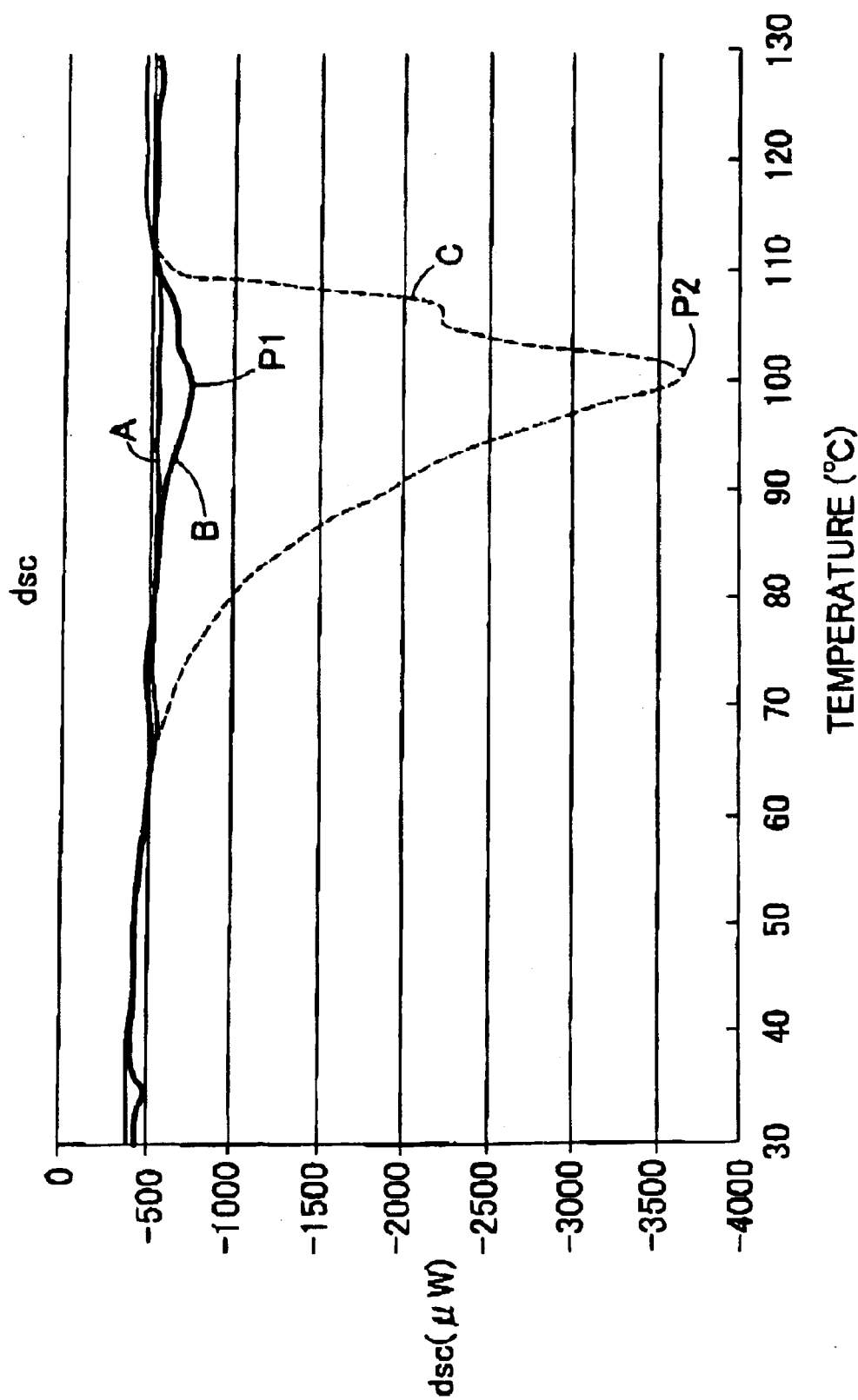
FIG. 3 is an explanatory view showing the result of differential thermal measurement conducted for the polymer resin particle obtained in Example 2 in which curve A is a reference curve measured for a resin particle not containing wax, curve B is a curve showing the result of measurement obtained for measured sample containing a polymer resin particle and curve C shows the result of measurement only for wax.

The result of the measurement is identical with that in Example 1, and shown in FIG. 3. As explained for Example 1, in FIG. 3, curve A is a reference curve for measurement of the wax-free resin particles in which neither endothermic reaction nor exothermic reaction was taken place. Further, curve B shows the result of measurement obtained for the specimen for measurement in which a small peak P1 for the endothermic reaction was obtained near 100° C. The peak P1 is an endothermic peak due to melting of the fine wax particles incorporated in the polymer resin in the measured sample and it can be seen therefrom that the fine wax particles were incorporated in the polymer resin particles. Curve C shows the result for measurement only for the wax in which a large peak P2 for endothermic reaction was obtained near 100° C., as well as in the curve B. It can be seen also from the endothermic peak P2 in the curve C that the endothermic P1 obtained for the curve B is a peak generated due to the melting of the fine wax particles incorporated in the polymer resin particle.

⑤ Confirmation of the Wax Content

The polymer resin particles obtained as described above were dissolved in a styrene monomer to take out only the incorporated wax. Weight of the taken out wax was divided by the weight of the polymer resin particles before dissolution to determine the content. It was about 12%.

⑥ Confirmation of Incorporated Form of Wax

The polymer resin particles obtained as described above were embedded in an epoxy resin and a slice of about 100 nm was prepared by using an ultra-microtome. Then, it was reinforced with carbon and observed by using an electron microscope (model B-8100, manufactured by Hitachi) at an acceleration voltage of 100 kV. As a result, it was confirmed that several fine wax particles are incorporated in the polymer resin particle.

Example 3

① Preparation of Magnetite-Containing Wax

Wax (CELAMER 67: manufactured by Toyo Petrolite Co.) was heated to 90° C., and 5 parts by weight of magnetite was mixed and stirred into 15 parts by weight of the heated wax to form magnetite-containing wax. Fine particles of magnetite were incorporated in the magnetite containing wax.

② Fine Dispersion Treatment of Fine Wax Particles

A mixture comprising the composition shown below was charged in a reaction vessel equipped with a stirrer, a condenser, a thermometer and a gas introduction tube.

| Ethanol 90 wt % aqueous solution | 300.0 parts by weight |
| Polyvinyl pyrrolidone | 5.0 parts by weight |
| Magnetite-containing wax | 20.0 parts by weight |

After stirring and mixing the mixture at 60° C. by 250 rpm for 5 hours while supplying a nitrogen gas, the number of rotation was increased to 10,000 rpm and, further, it was stirred for 30 min to obtain a fine liquid dispersion of magnetite-containing wax. The average grain size of the wax was 0.4 μm. The zeta-potential of fine particles of the magnetite-containing wax was measured by using laser zeta potentiometer ELS-8000 manufactured by Otsuka Electronics Co., Ltd. As a result, the zeta-potential of the magnetite-containing wax was (+). The zeta-potential of the wax was (+).

② Polymer Particle Resin Forming Treatment

Then, into the fine liquid dispersion solution of the magnetite-containing wax obtained as described above,

| Styrene | 59.9 parts by weight |
| n-butyl acrylate | 17.9 parts by weight |
| α,α'-azobisisobutylonitrile | 4.7 parts by weight | were added as monomers and stirring was started at 60° C. by 250 rpm. The monomer was grown in about one hour from the start of the stirring and a polymer started to deposit in the first embodiment. In this case, the fine polymer particles deposited on the surface of the wax by the static electricity caused between them and the magnetite-containing wax previously dispersed in the solution.

When stirring was conducted for further 4 hours, to continue growing and deposition of the monomer and the grain size was measured by using a Shimadzu laser diffraction type grain size distribution measuring apparatus SALD-3000 manufactured by Shimadzu Corporation, the volume average particle size reached 16.7 μm to obtain an aimed particle size. Then, stirring was stopped and cooling was conducted by an iced water bath to 20° C. The obtained polymer resin particles were filtered and recovered, washed with methanol and left for 48 hours at a room temperature to dry the polymer resin particles.

③ Polymer Resin Particle Recovery Treatment

The liquid dispersion of the polymer resin particles obtained as described above were recovered by filtration and the particles were washed with methanol.

The recovered particles were re-dispersed in 400 ml of an aqueous 30 ppm solution of sodium dodecyl benzene sulfonate, temperature was elevated and the magnetite-containing wax not incorporated into the polymer resin particle was separated by melting. Then, NaCl was added to completely separate the magnetite-containing wax and only the polymer resin particles were recovered by filtration and stood still at a room temperature for 48 hours to dry and obtain polymer resin particles. When the zeta-potential of the particles was measured, it showed (−) and it could be confirmed that the surface was covered with the polymer resin. When the polymer resin particles at this step was confirmed by a scanning type electron microscope (manufactured by Shimadzu Corporation), it has a substantially spherical shape as shown in FIG. 1.

④ Confirmation of Wax Incorporation: Differential Thermal Analysis

The polymer resin particle obtained as described above was measured by a differential thermal analyzer. A specimen for measurement was placed by 2.5 mg in an aluminum pan and measurement was conducted within a measuring temperature range of 30° C. to 150° C. at a temperature elevation rate of 5° C./min while using wax-free resin particles as a reference. Further, only the wax was placed by 2.6 mg in the aluminum pan and measured under the same conditions as described above.

As the result of the measurement, a similar trend with that shown in FIG. 2 was obtained in the same manner as in Example 1 and it was confirmed that the magnetite-containing fine wax particles were incorporated in the polymer resin particle.

⑤ Confirmation of Wax Content

The polymer resin particles obtained as described above were dissolved in a styrene monomer to take out only the wax from the incorporated magnetite-containing wax. Weight of the taken out wax was divided by the weight of the polymer resin particles before dissolution to determine the content. It was about 15%.

⑥ Confirmation of Incorporated Form of Wax

The polymer resin particles obtained as described above were embedded in an epoxy resin and a slice of about 100 nm was prepared by using an ultra-microtome. Then, it was reinforced with carbon and observed by using an electron microscope (model H-8100, manufactured by Hitachi) at an acceleration voltage of 100 kV. As a result, it was confirmed that several fine magnetite-containing wax particles were incorporated in the polymer resin particle.

Comparative Example 1

When the polymer resin particles were produced in the same manner as in Example 1 except for increasing the amount of polyvinyl pyrrolidone as the polymeric dispersant to 3 parts by weight, particles agglomerated to each other in the polymerization step after addition of the monomer, and the polymer resin particles could not be taken out as primary particles.

Comparative Example 2

When the polymer resin particles were produced in the same manner as in Example 1 except for changing the stirring and mixing conditions to 5000 rpm for 10 min after stirring and mixing at 60° C. for 5 hours by 250 rpm for wax dispersion. The average particle size of the dispersed wax was 2.6 μm. During preparation of the polymer resin particles, the system was instable and the wax was not incorporated in the obtained polymer resin particle, a number of macro agglomerates around the wax as a nuclei were observed and it was difficult to be taken out as primary particles.

Comparative Example 3

When the polymer resin particles were produced in the same manner as in Example 1 except for using a polypropylene wax not having functional groups as a wax to be charged into the organic solvent. However, in the dispersion of the wax in the initial stage, a liquid wax dispersion of uniform grain size could not be obtained and, accordingly, polymer resin particles incorporated with wax could not be obtained.

Comparative Example 4

The polymer resin particles were produced in the same manner as in Example 1 except for conducting fine treatment with further addition of 5 parts by weight of magnetite in addition to ethanol, polyvinyl pyrrolidone and wax in the fine dispersion treatment of the fine wax particles in Example 1. While the average grain size of the thus obtained polymer resin particles was 17.8 μm, many magnetite was observed in the portion other than the polymer resin particles when observing the polymer resin particles by using an electron microscope, and only few magnetite was observed in the polymer resin particles.

The present invention is not restricted to the embodiments described above and it will be apparent that the invention can be improved or modified variously within a range not departing from the gist of the invention. For example, polymerization for the polymer resin particles described above may be conducted after mixing and stirring the charge controller and the like and a wax having good wettability to the charge controller, thereby incorporating the charge controller and the like to the fine wax particles.

As has been described above, in the method of manufacturing the polymer resin particles for use in the toner by dispersing fine wax particles using a polymeric dispersant into an organic solvent, according to the present invention since the wax ingredient forming the fine wax particles are selected such that the surface potential of the fine wax particles dispersed in the organic solvent show the polarity opposite to the surface potential of the fine polymer particles, one or more of monomers forming the polymer is dissolved and the polymerizing reaction of the monomer is proceeded while depositing fine polymer particles to the surface of the fine wax particles upon deposition of the polymer in the organic solvent in the initial stage of the polymerizing reaction of the monomer, the fine polymer particles are attracted to the surface of the fine wax particle in the initial stage of the polymerizing reaction of the monomer and, accordingly, the fine polymer particles can be deposited in a short time and simply on the surface of the fine wax particle. Further, fine wax particles can be incorporated sufficiently into the formed polymer particles.

When the polymer particles prepared as described above are used as a toner, since fine wax particles are incorporated in the polymer particles, offset in a heat fixing device provided to a copying machine or the like can be prevented with no external addition of the wax, and with no provision of an oil coating device to the copying machine or the like, thereby capable of improving the fixing property of the toner and forming images at high fineness.

What is claimed is:

1. A method of manufacturing polymer resin particles for use in a toner by:

dispersing fine wax particles less soluble to an organic solvent by using a polymeric dispersant into the organic solvent, dissolving one or more of monomers for forming a polymer less soluble to the organic solvent; and proceeding a polymerizing reaction of the monomers while depositing fine polymer particles on a surface of the fine wax particle upon deposition of the polymer in the organic solvent in an initial stage of the polymerizing reaction of the monomer, thereby forming polymer resin particles for use in the toner incorporating fine wax particles therein; wherein a wax ingredient forming the fine wax particles is selected such that a surface potential of the fine wax particles dispersed in the organic solvent shows a polarity opposite to a surface potential of the fine polymer particle.

2. A method of manufacturing polymer resin particles for use in a toner according to claim 1, wherein the fine wax particles comprises a wax ingredient having at least one functional group selected from the group consisting of hydroxyl group, carboxyl group, carbonyl group, ether group, phenyl group, phosphate group and sulfonate group.

3. A method of manufacturing polymer resin particles for use in a toner according to claim 1, wherein a colorant is incorporated in the fine wax particle.

4. A method of manufacturing polymer resin particles for use in a toner according to claim 1, wherein the monomer is a styrenic monomer or acrylic monomer.

5. A method of manufacturing polymer resin particles for use in a toner according to claim 1, wherein the polymer resin particle for use in the toner is a substantially spherical particle.

6. A method of manufacturing polymer resin particles for use in a toner according to claim 1, wherein the average particle size of the fine wax particle is 1 μm or less.

7. A method of manufacturing polymer resin particles for use in a toner according to claim 1, wherein a plurality of fine wax particles are incorporated in the polymer resin particle for use in the toner.

8. A method of manufacturing polymer resin particles for use in a toner according to claim 2, wherein a colorant is incorporated in the fine wax particle.

9. A method of manufacturing polymer resin particles for use in a toner according to claim 2, wherein the monomer is a styrenic monomer or acrylic monomer.

10. A method of manufacturing polymer resin particles for use in a toner according to claim 2, wherein the polymer resin particle for use in the toner is a substantially spherical particle.

11. A method of manufacturing polymer resin particles for use in a toner according to claim 2, wherein the average particle size of the fine wax particle is 1 μm or less.

12. A method of manufacturing polymer resin particles for use in a toner according to claim 2, wherein a plurality of fine wax particles are incorporated in the polymer resin particle for use in the toner.

13. A method of manufacturing polymer resin particles for use in a toner according to claim 3, wherein the monomer is a styrenic monomer or acrylic monomer.

14. A method of manufacturing polymer resin particles for use in a toner according to claim 3, wherein the polymer resin particle for use in the toner is a substantially spherical particle.

15. A method of manufacturing polymer resin particles for use in a toner according to claim 3, wherein the average particle size of the fine wax particle is 1 μm or less.

16. A method of manufacturing polymer resin particles for use in a toner according to claim 3, wherein a plurality of fine wax particles are incorporated in the polymer resin particle for use in the toner.

17. A method of manufacturing polymer resin particles for use in a toner according to claim 4, wherein the polymer resin particle for use in the toner is a substantially spherical particle.

18. A method of manufacturing polymer resin particles for use in a toner according to claim 4, wherein the average particle size of the fine wax particle is 1 μm or less.

19. A method of manufacturing polymer resin particles for use in a toner according to claim 4, wherein a plurality of fine wax particles are incorporated in the polymer resin particle for use in the toner.

20. A method of manufacturing polymer resin particles for use in a toner according to claim 5, wherein the average particle size of the fine wax particle is 1 μm or less.

21. A method of manufacturing polymer resin particles for use in a toner according to claim 5, wherein a plurality of fine wax particles are incorporated in the polymer resin particle for use in the toner.

22. A method of manufacturing polymer resin particles for use in a toner according to claim 6, wherein a plurality of fine wax particles are incorporated in the polymer resin particle for use in the toner.

* * * * *